(12) United States Patent
Smith et al.

(10) Patent No.: US 11,391,211 B2
(45) Date of Patent: Jul. 19, 2022

(54) WASTE HEAT RECOVERY SYSTEM

(71) Applicant: General Electric Company, Schenectady, NY (US)

(72) Inventors: Justin Paul Smith, Montgomery, OH (US); Brandon Wayne Miller, Liberty Township, OH (US); Thomas Helmut Ripplinger, Weichs (DE)

(73) Assignee: General Electric Company, Schenectady, NY (US)

( * ) Notice: Subject to any disclaimer, the term of this patent is extended or adjusted under 35 U.S.C. 154(b) by 250 days.

(21) Appl. No.: 16/202,677

(22) Filed: Nov. 28, 2018

(65) Prior Publication Data

US 2020/0165974 A1    May 28, 2020

(51) Int. Cl.
| | |
|---|---|
| *F02C 7/224* | (2006.01) |
| *F02C 3/05* | (2006.01) |
| *F02C 7/18* | (2006.01) |

(52) U.S. Cl.
CPC .............. *F02C 7/224* (2013.01); *F02C 3/05* (2013.01); *F02C 7/18* (2013.01); *F05D 2210/12* (2013.01); *F05D 2220/323* (2013.01); *F05D 2260/205* (2013.01); *F05D 2260/213* (2013.01); *F05D 2270/20* (2013.01)

(58) Field of Classification Search
CPC ...... F02C 7/14; F02C 7/16; F02C 7/18; F02C 7/185; F02C 7/224
See application file for complete search history.

(56) References Cited

U.S. PATENT DOCUMENTS

| | | | |
|---|---|---|---|
| 2,582,842 | A | 1/1952 | Messinger |
| 2,720,313 | A | 10/1955 | Pattison |
| 2,893,628 | A | 7/1959 | Herman |
| (Continued) | | | |

FOREIGN PATENT DOCUMENTS

| | | |
|---|---|---|
| EP | 2003311 A2 | 12/2008 |
| EP | 3018304 A1 | 5/2016 |
| (Continued) | | |

OTHER PUBLICATIONS

U.S. Appl. No. 15/819,327, filed Nov. 28, 2017.
(Continued)

*Primary Examiner* — Craig Kim
(74) *Attorney, Agent, or Firm* — Dority & Manning, P.A.

(57) ABSTRACT

A turbine engine includes a compressor section, a combustion section, a turbine section, and an exhaust section in serial flow order and together defining a core air flowpath; a fuel delivery system for providing a flow of fuel to the combustion section; and a waste heat recovery system. The waste heat recovery system includes a heat source exchanger in thermal communication with the turbine section, the exhaust section, or both; a heat sink exchanger in thermal communication with the fuel delivery system, the core air flowpath, or both; a thermal transfer bus including a thermal transfer fluid and extending from the heat source exchanger to the heat sink exchanger; and a pump in fluid communication with the thermal transfer bus downstream of the heat source exchanger and upstream of the heat sink exchanger for increasing a temperature and a pressure of the thermal transfer fluid in the thermal transfer bus.

19 Claims, 5 Drawing Sheets

(56) References Cited

U.S. PATENT DOCUMENTS

| | | |
|---|---|---|
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,782,076 A * | 7/1998 | Huber ................ F02C 7/08 415/115 |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 * | 9/2005 | Huang ................ B01D 63/084 95/46 |
| 7,093,437 B2 | 8/2006 | Spadaccini et al. |
| 7,254,937 B2 * | 8/2007 | Hull .................... F02C 7/08 60/266 |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-Wlam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0000205 A1 * | 1/2012 | Coffinberry ............ F02C 7/14 60/806 |
| 2012/0067055 A1 * | 3/2012 | Held ..................... F02C 1/06 60/772 |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 * | 6/2017 | Miller ................ B64D 33/02 |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2018/0216575 A1 * | 8/2018 | Miller ................ F02C 7/18 |
| 2019/0128189 A1 * | 5/2019 | Rambo ............... F02K 3/115 |

FOREIGN PATENT DOCUMENTS

| | | |
|---|---|---|
| EP | 3075957 A1 | 10/2016 |
| GB | 2136880 A | 9/1984 |
| GB | 2204361 A | 11/1988 |
| JP | S5932893 U | 2/1984 |

(56) References Cited

FOREIGN PATENT DOCUMENTS

| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.
Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php.

* cited by examiner

WASTE HEAT RECOVERY SYSTEM

FIELD

The present subject matter relates generally to a waste heat recovery system for a gas turbine engine and a method for operating the same.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts.

During operation of the gas turbine engine, a relatively large amount of heat energy is generated through the compression process by the compressors and through the combustion process within the combustor. While a substantial portion of the heat energy is extracted through the one or more turbines, a portion of such heat energy is exhausted to atmosphere. Such may lead to a loss of efficiency of the gas turbine engine. Accordingly, a system and/or method for operating a gas turbine engine in a manner to increase an efficiency of the gas turbine engine, and reduce an amount of waste heat exhausted to atmosphere, would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a compressor section, a combustion section, a turbine section, and an exhaust section in serial flow order and together defining a core air flowpath, the compressor section defining a downstream end. The gas turbine engine also includes a fuel delivery system for providing a flow of fuel to the combustion section; and a waste heat recovery system. The waste heat recovery system includes a heat source exchanger in thermal communication with the turbine section, the exhaust section, or both; a heat sink exchanger in thermal communication with the fuel delivery system, the core air flowpath upstream of the combustion section, or both; a thermal transfer bus including a thermal transfer fluid and extending from the heat source exchanger to the heat sink exchanger; and a pump in fluid communication with the thermal transfer bus downstream of the heat source exchanger and upstream of the heat sink exchanger for increasing a temperature and a pressure of the thermal transfer fluid in the thermal transfer bus.

In certain exemplary embodiments the thermal transfer bus is a closed-loop thermal transfer bus further extending from the heat sink exchanger back to the heat source exchanger.

For example, in certain exemplary embodiments the waste heat recovery system further includes an expansion device in fluid communication thermal transfer bus downstream of the heat sink exchanger and upstream of the heat source exchanger.

In certain exemplary embodiments the heat sink exchanger is in thermal communication with the compressor section at the downstream end of the compressor section.

For example, in certain exemplary embodiments the heat sink exchanger is in thermal communication with the compressor section at an exit of an HP compressor of the compressor section.

In certain exemplary embodiments the heat source exchanger is in thermal communication with the exhaust section.

In certain exemplary embodiments the heat sink exchanger is in thermal communication with the compressor section at the downstream end, wherein the downstream end of the compressor section defines a sink reference temperature at an engine operating speed, wherein the heat source exchanger is in thermal communication with the exhaust section, wherein the exhaust section defines an source reference temperature at the engine operating speed, and wherein the source reference temperature is less than the sink reference temperature.

For example, in certain exemplary embodiments the source reference temperature is at least about five percent less than the sink reference temperature.

For example, in certain exemplary embodiments the engine operating speed is between about seventy-five percent and about one hundred percent of a maximum rated speed of the engine.

For example, in certain exemplary embodiments the heat sink exchanger is in thermal communication with the compressor section at an exit of an HP compressor of the compressor section.

In certain exemplary embodiments the gas turbine engine defines an overall pressure ratio of at least about 25.

In another exemplary embodiment of the present disclosure, a gas turbine engine is provided. The gas turbine engine includes a compressor section defining a downstream end and the downstream end defining a sink reference temperature at an engine operating speed; a combustion section; a turbine section; an exhaust section arranged in serial flow order with, and defining a core air flowpath with, the compressor section, the combustion section, and the turbine section, the exhaust section further defining an source reference temperature at the engine operating speed, the source reference temperature being less than the sink reference temperature; a fuel delivery system for providing a flow of fuel to the combustion section; and a waste heat recovery system. The waste heat recovery system includes a heat source exchanger in thermal communication with the exhaust section; a heat sink exchanger in thermal communication with the core air flowpath upstream of the combustion section; and a thermal transfer bus including a thermal transfer fluid and extending from the heat source exchanger to the heat sink exchanger.

In certain exemplary embodiments the waste heat recovery system further includes a pump in fluid communication with the thermal transfer bus downstream of the heat source exchanger and upstream of the heat sink exchanger for increasing a temperature and a pressure of the thermal transfer fluid in the thermal transfer bus.

In certain exemplary embodiments the engine operating speed is between about seventy-five percent and about one hundred percent of a maximum rated speed of the engine.

In certain exemplary embodiments the engine operating speed is between a cruise engine operating speed and a takeoff engine operating speed.

In an exemplary aspect of the present disclosure a method is provided for operating a gas turbine engine including a fuel delivery system and a compressor section, a combustion section, a turbine section, and an exhaust section in serial flow order. The method includes extracting heat from the exhaust section, the turbine section, or both using a heat source exchanger of a waste heat recovery system of the gas turbine engine; and transferring the extracted heat through a thermal transfer bus of the waste heat recovery system to a heat sink exchanger in thermal communication with the compressor section proximate a downstream end of the compressor section, the fuel delivery system, or both, wherein transferring the extracted heat through the thermal transfer bus includes increasing a temperature and a pressure of a thermal transfer fluid within the thermal transfer bus using a pump at a location downstream of the heat source exchanger and upstream of the heat sink exchanger.

In certain exemplary aspects the method further includes transferring heat from the heat sink exchanger to the compressor section proximate the downstream end.

For example, in certain exemplary aspects extracting heat from the exhaust section, the turbine section, or both using the heat source exchanger includes extracting heat from a location within the exhaust section, the turbine section, or both defining a source reference temperature, wherein transferring heat from the heat sink exchanger to the compressor section proximate the downstream end includes transferring heat from the heat sink exchanger to a location defining a sink reference temperature, and wherein the source reference temperature is less than the sink reference temperature.

For example, in certain exemplary aspects the source reference temperature is at least about five percent less than the sink reference temperature.

In certain exemplary aspects the method further includes providing the thermal transfer fluid from the heat sink exchanger back to the heat source exchanger.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
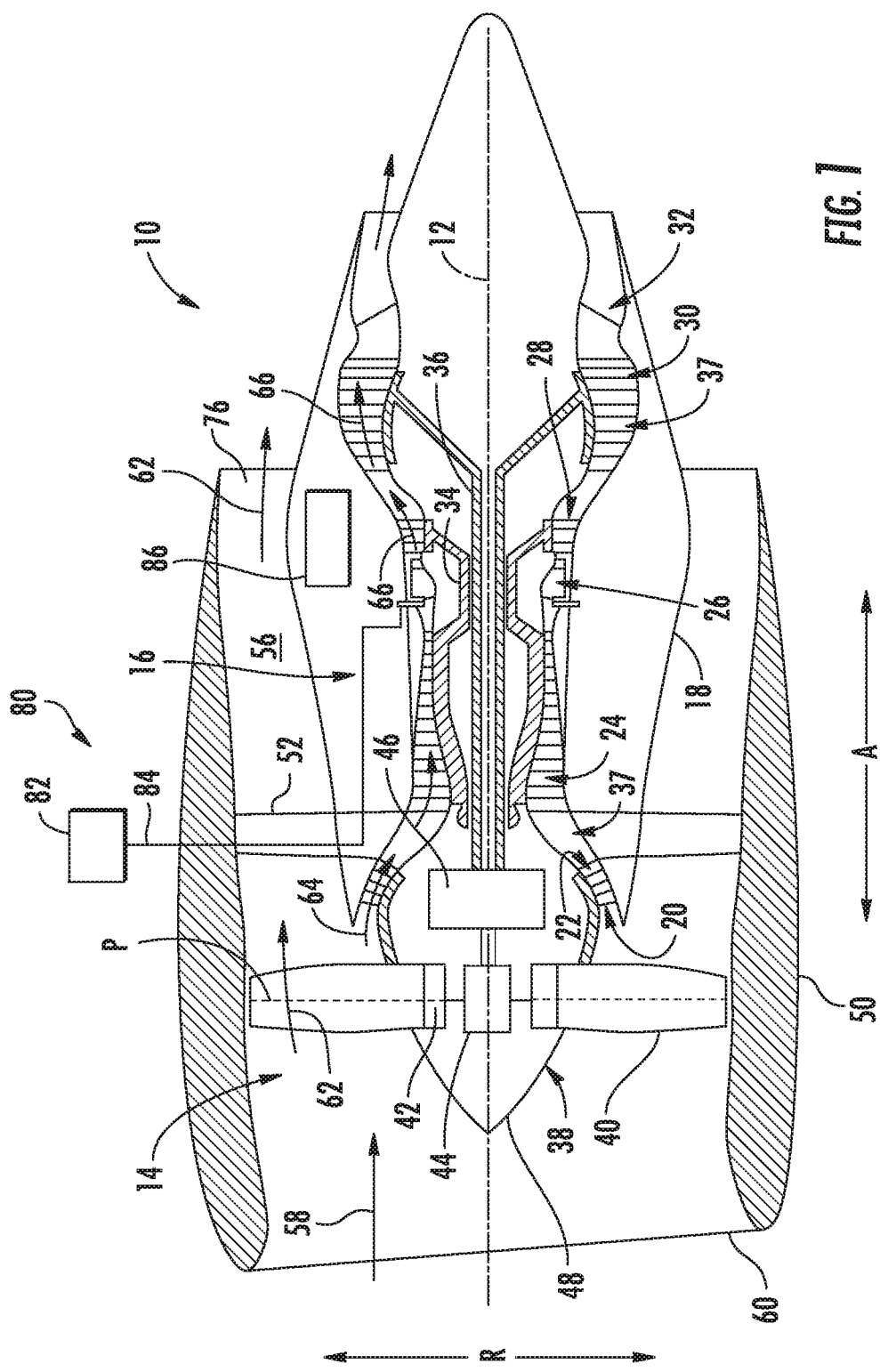
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Further, the exemplary turbofan engine 10 includes a fuel delivery system 80 providing a flow of fuel to the combustion section 26 of the turbofan engine 10. The fuel delivery system 80 generally includes a fuel source 82 and a plurality of fuel lines 84. The fuel source 82 may be, e.g., a fuel tank positioned within a fuselage or one or more wings of an aircraft including the turbofan engine 10. Additionally, the one or more fuel lines 84 extend from the fuel source 82 to one or more fuel nozzles (not shown) within the combustion section 26.

Further, still, the exemplary turbofan engine 10 depicted includes a waste heat recovery system 86. As will be explained in greater detail below, the waste heat recovery system may generally be configured to extract heat from an airflow through the exhaust section 32 (and/or through sections of the turbine section) and provide such heat to one or both of the fuel delivery system 80 (such as to a fuel flow through the one or more fuel lines 84), the compressor section (such as a downstream end of the HP compressor 24), or both.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may include any suitable number of compressors, turbines (such as an intermediate turbine in addition to an LP and HP turbine), shafts/spools (e.g., one spool, two spools, three spools), etc. Further, in certain exemplary embodiments, aspects of the present disclosure may further apply to any other suitable aeronautical gas turbine engines, such as a turbojet engine, turboshaft engine, turboprop engine, etc. Additionally, in still other exemplary embodiments, the exemplary turbofan engine 10 may not be configured as an aeronautical gas turbine engine, and instead may be configured as an industrial gas turbine engine (e.g., utilized for power generation), a nautical gas turbine engine, etc.

Figure 2:
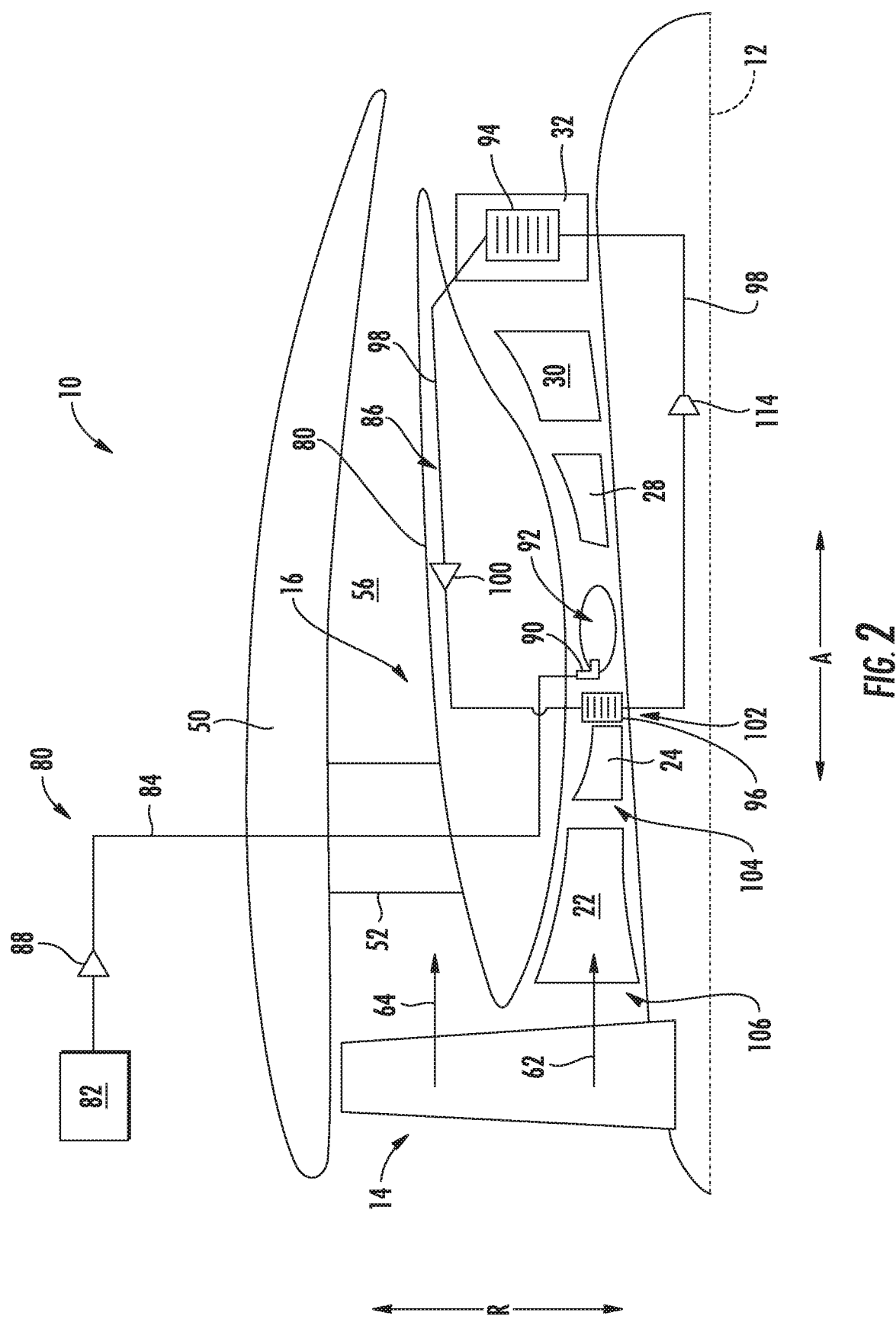
FIG. 2 is a simplified schematic view of a gas turbine engine and a waste heat recovery system in accordance with an exemplary embodiment of the present disclosure.

Referring now to FIG. 2, a simplified, schematic view of a gas turbine engine 10 in accordance with an exemplary aspect of the present disclosure is provided. The exemplary gas turbine engine 10 depicted in FIG. 2 may be configured in substantially the same manner as exemplary turbofan engine 10 described above with reference to FIG. 1.

For example, as is shown, the gas turbine engine 10 generally includes a fan section 14 and a turbomachine 16. The turbomachine 16 includes in serial flow order a compressor section having an LP compressor 22 and an HP compressor 24, a combustion section 26, a turbine section including an HP turbine 28 and an LP turbine 30, and an exhaust section 32. The compressor section, the combustion section 26, the turbine section, and the exhaust section 32 generally define a core air flowpath 37 extending therethrough.

A fuel delivery system 80 is also included for providing a flow of fuel to the combustion section 26 of the gas turbine engine 10, and more specifically to a combustion chamber 92 of the combustion section 26. For example, the fuel delivery system 80 generally includes a plurality of fuel lines 84 and a fuel nozzle 90. The fuel nozzle 90 may receive a flow of fuel from the plurality of fuel lines 84 and further may receive compressed air from the compressor section (e.g., the HP compressor 24). The fuel nozzle 90 may accordingly provide a mixture of compressed air and fuel to the combustion chamber 92, wherein such mixture of compressed air and fuel is combusted to generate combustion gasses. The fuel delivery system 80 generally also includes a fuel source 82 and a pump 88 in fluid communication with the one or more fuel lines 84, the pump 88 configured for increasing a pressure of a fuel flow from the fuel source 82 and through the one or more fuel lines 84.

Moreover, the turbomachine 16 and fan section 14 are at least partially surrounded by an outer nacelle 50, with the turbomachine 16 supported relative to the outer nacelle 50 through a plurality of outlet guide vanes 52. The outer nacelle 50 defines a bypass airflow passage 56 with the turbomachine 16. A first portion 62 of an airflow from the fan section 14 is provided through the turbomachine 16 as a core airflow, and a second 64 portion of the airflow from the fan section 14 is provided through the bypass airflow passage 56 as a bypass airflow.

In addition, the exemplary gas turbine engine 10 includes a waste heat recovery system 86. The exemplary waste heat recovery system 86 is generally configured to extract heat from a heat source (e.g., a heat source not fully utilizing the heat being extracted therefrom) and transfer such extracted heat to a heat sink, such that the heat sink may more efficiently utilize such extracted heat.

Referring particularly to the exemplary waste heat recovery system 86 depicted in FIG. 2, the waste heat recovery system 86 generally includes a heat source exchanger 94 (i.e., a heat exchanger configured to extract heat for the waste heat recovery system 86 from a heat source of the engine 10), a heat sink exchanger 96 (i.e., a heat exchanger configured to transfer heat from the waste heat recovery system 86 to a heat sink of the engine 10), a thermal transfer bus 98, and a pump 100. Each of these components are described in greater detail as follows.

For the embodiment shown, the heat source exchanger 94 is in thermal communication with the heat source, which may generally be the turbine section, the exhaust section 32, or both. Specifically, for the embodiment of FIG. 2, the heat source is the exhaust section 32 of the gas turbine engine 10, such that the heat source exchanger 94 is in thermal communication with the exhaust section 32 of the gas turbine engine 10. For example, the heat source exchanger 94 may be integrated into a strut extending through the exhaust section 32 or a liner defining at least in part the exhaust section 32, or alternatively may be positioned at any other suitable location in thermal communication with an airflow/gasses through the exhaust section 32 of the gas turbine engine 10.

Moreover, for the exemplary embodiment depicted, the heat sink exchanger 96 is in thermal communication with the heat sink, which may generally be the compressor section, the fuel delivery system 80, or both. More specifically, for the embodiment depicted, the heat sink exchanger 96 is in thermal communication with the compressor section at a location proximate a downstream end of the compressor section, or more specifically still with a location proximate a downstream end of the HP compressor 24 of the compressor section. It will be appreciated, that as used herein, the term "proximate the downstream end," with reference to the compressor section refers to a location closer to an exit of the compressor section than an inlet to the compressor section and upstream of the combustion chamber 92. Similarly, as used herein, the term "proximate the downstream end," with reference to the HP compressor 24 refers to a location closer to an exit 102 of the HP compressor 24 than an inlet 104 to the HP compressor 24 and upstream of the combustion chamber 92. For example, in certain embodiments, the heat sink exchanger 96 may be integrated into, or coupled to, a strut or guide vane, such as a diffuser, positioned at the compressor exit 102 and upstream of the combustion chamber 92 of the combustion section 26. Additionally, or alternatively, the heat sink exchanger 96 may be integrated into, or coupled to, one or more fuel nozzles 90 of the fuel delivery system 80.

More specifically still, for the embodiment shown, the heat sink exchanger 96 is in thermal communication with the exit 102 of the HP compressor 24 of the gas turbine engine 10. The "compressor exit" refers to an outlet of the HP compressor 24. In such a manner, the heat sink exchanger 96 may add heat to an airflow through the core air flowpath 37 prior to such airflow entering the combustion chamber 92, resulting in a more efficient gas turbine engine 10.

Further, as stated, the waste heat recovery system 86 includes the thermal transfer bus 98. The thermal transfer bus 98 includes a thermal transfer fluid and extends from the heat source exchanger 94 to the heat sink exchanger 96. In such a manner, the thermal bus is configured to transfer the thermal transfer fluid from the heat source exchanger 94 (wherein the thermal transfer fluid has accepted heat from the airflow through, for the embodiment shown, the exhaust section 32 of the gas turbine engine 10) to the heat sink exchanger 96 (wherein the thermal transfer fluid transfers heat to the airflow through, for the embodiment shown, the compressor exit 102 of the HP compressor 24, or other location upstream of the combustion chamber 92). The thermal transfer bus 98 may include one or more pipes, conduits, etc. arranged in series, parallel, or some combination thereof.

Notably, in at least certain exemplary embodiments the gas turbine engine 10 may define a relatively high overall pressure ratio. As used herein, the term overall pressure ratio refers to a ratio of a pressure of the air through the turbomachine 16 at an outlet of the compressor section (i.e., the exit 102 of the HP compressor 24 for the embodiment shown) to a pressure of the air through the turbomachine 16 at an inlet of the compressor section (i.e., an inlet 106 of the LP compressor 22 for the embodiment shown). In at least certain exemplary embodiments, the overall pressure ratio of the gas turbine engine 10 depicted in FIG. 2 may be at least about 25. For example, in certain exemplary embodiments, the overall pressure ratio of the gas turbine engine 10 depicted in FIG. 2 may be at least about 28, such as at least about 30, such as at least about 32, such as up to about 75. Given the relatively high overall pressure ratio of the exemplary gas turbine engine 10 depicted, it will be appreciated that a temperature of the airflow through the exhaust section 32 of the gas turbine engine 10 may be less than a temperature of the airflow through the downstream end of the compressor section, such as the downstream end of the HP compressor 24, such as the compressor exit 102 of the HP compressor 24.

Figure 3:
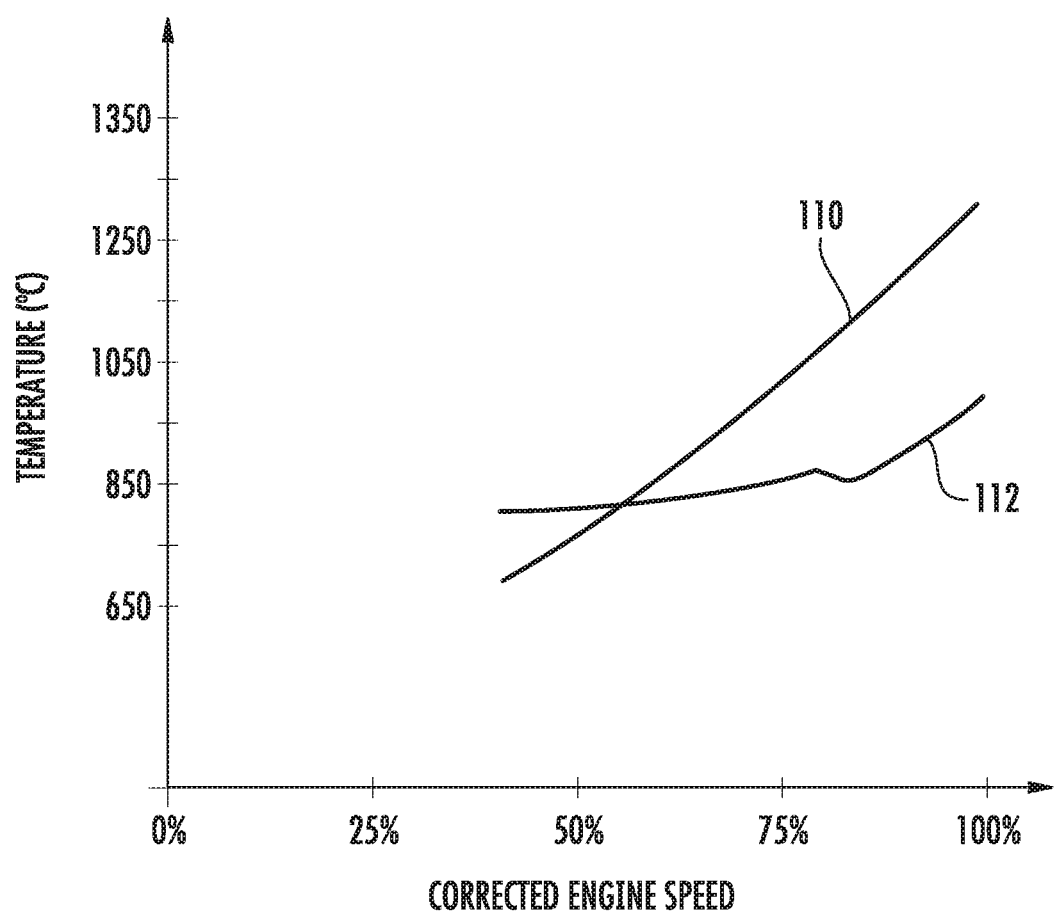
FIG. 3 is graph depicting reference temperatures at a heat source and a heat sink of a gas turbine engine during operation.

For example, referring now briefly also to FIG. 3, a graph depicting a sink reference temperature 110 and a source reference temperature 112 relative to an engine operating speed, and more specifically a corrected engine speed (where 100% is a maximum rated speed for the engine 10) is provided. It will be appreciated that the downstream end of the compressor section may define the sink reference temperature 110 during operation (which for the embodiment shown is the temperature at the exit 102 of the HP compressor 24, sometimes also referred to as "T3"). Similarly, the exhaust section 32 may define a source reference temperature 112 during operation (i.e., a temperature of an airflow through the exhaust section 32, sometimes also referred to as "T5"). For the exemplary embodiment depicted, the source reference temperature 112 is less than the sink reference temperature 110. For example, the source reference temperature 112 may be at least about five (5) percent less than the sink reference temperature 110, such as at least about ten (10) percent less than the sink reference temperature 110, such as up to about fifty (50) percent less than the sink reference temperature 110. In at least certain exemplary embodiments, the sink reference temperature 110 and source reference temperature 112 may be defined (having the temperature difference noted above) at an engine operating speed between 80% and 100% of a maximum rated speed for the engine 10, such as between 70% and 100% of a maximum rated speed for the engine 10, such as between 60% and 100% of a maximum rated speed for the engine 10. Additionally or alternatively, the sink reference temperature 110 and source reference temperature 112 may be defined (having the temperature difference noted above) at an engine operating speed between a cruise operating speed (i.e., a typical speed of the engine during a cruise operating mode) and a climb operating speed (i.e., a typical speed of the engine during a climb operating mode).

Accordingly, referring back specifically to FIG. 2, in order to allow the exemplary waste heat recovery system 86 depicted in FIG. 2 to transfer heat from the heat source/heat source exchanger 94 to the heat sink/heat sink exchanger 96, the exemplary waste heat recovery system 86 further includes the pump 100 in fluid communication with the thermal transfer bus 98 downstream of the heat source exchanger 94 and upstream of the heat sink exchanger 96 for increasing a temperature and a pressure of the thermal transfer fluid in the thermal transfer bus 98. For example, in certain exemplary embodiments, the pump 100 may be configured to provide at least about a twenty-five pounds per square inch ("psi") pressurize rise, such as at least about a fifty psi of pressurize rise, such as at least about a one hundred psi of pressurize rise, such as up to about five thousand psi pressure rise, in the thermal transfer fluid through the thermal transfer bus 98, and similarly may be configured to provide at least about one hundred and fifty (150) degrees Celsius temperature rise, such as at least about two hundred and fifty (250) degrees Celsius temperature rise, and up to about one thousand (1,000) degrees Celsius temperature rise, in the thermal transfer fluid through the thermal transfer bus 98. The pump 100 may be powered through, e.g., one or more of the shafts or spools of the gas turbine engine 10, or alternatively may be powered by an electric motor, hydraulic motor, pneumatic motor, or any other suitable power source. It will be appreciated, however, that in other exemplary embodiments, the pump 100 may have any other suitable configuration. For example, in other embodiments, the pump 100 may be configured to create any other suitable temperature and/or pressure rise, or some other suitable device or configuration may be provided to increase a temperature and/or pressure of the thermal fluid through the thermal transfer bus 98 and provide for the flow of thermal fluid through the thermal transfer bus 98.

Referring still to FIG. 2, it will be appreciated that the exemplary thermal transfer bus 98 is a closed loop thermal transfer bus 98 further extending from the heat sink exchanger 96 back to the heat source exchanger 94. Further, for the embodiment shown, the exemplary waste heat recovery system 86 further includes an expansion device in fluid communication with the thermal transfer bus 98 downstream of the heat sink exchanger 96 and upstream of the heat source exchanger 94. The expansion device may be any suitable expansion device. For example, for the embodiment shown, the expansion device is configured as a turbine 114 in fluid communication with the thermal transfer bus 98 downstream of the heat sink exchanger 96 and upstream of the heat source exchanger 94. With such an embodiment, the turbine 114 may extract additional energy from the thermal transfer fluid, increasing an efficiency of the waste heat recovery system 86 and gas turbine engine 10. As will be appreciated, inclusion of the expansion device may generally allow for the reduction of a temperature of the thermal transfer fluid to a relatively low temperature such that the thermal transfer fluid may accept heat from the heat source through the heat source exchanger 94. For example, the expansion device may reduce a temperature of the thermal transfer fluid at least about one hundred degrees Celsius, such as at least about one hundred and fifty degrees Celsius, such as up to about 1,000 degrees Celsius.

However, in other embodiments, the expansion device may not be configured to extract additional work form the thermal transfer fluid, and instead may simply be configured to expand the thermal transfer fluid (e.g., through an increasing cross-sectional area) to reduce a temperature and pressure of the thermal transfer fluid. Further, although the expansion device/turbine 114 is depicted schematically inward of the core air flowpath 37 along a radial direction R of the gas turbine engine 10 of FIG. 2, in other embodiments, the expansion device/turbine 114 may instead be positioned outward of the core air flowpath 37 along the radial direction R and within the cowling 80 of the turbomachine 16 (see, e.g., the embodiment of FIG. 4, discussed below), or elsewhere.

In one or more these embodiments, the thermal transfer fluid may be a single phase thermal transfer fluid during operation of the waste heat recovery system 86. In such a manner, the thermal transfer fluid may remain in substantially a liquid phase during operation. Alternatively, the thermal transfer fluid may be a phase change thermal transfer fluid during operation of the waste heat recovery system 86. For example, the waste heat recovery system 86 may generally operate on a refrigeration cycle, such that the thermal transfer fluid changes between liquid and gaseous phases during operation of the waste heat recovery system 86. Additionally, or alternatively still, in one or more these configurations, the thermal transfer fluid may be in a supercritical phase during one or more stages of operation, or during all operations. For example, the thermal transfer fluid may be a supercritical $CO_2$ during certain operations or all operations of the waste heat recovery system 86.

It will be appreciated, however, that the exemplary gas turbine engine 10 and waste heat recovery system 86 depicted in FIG. 2 is provided by way of example only. In other embodiments, the waste heat recovery system 86 may have any other suitable configuration. For example, referring now to FIG. 4, a gas turbine engine 10 including a waste heat recovery system 86 in accordance with another exemplary embodiment of the present disclosure is depicted. The exemplary gas turbine engine 10 and waste heat recovery system 86 of FIG. 4 may be configured in substantially the same manner as exemplary gas turbine engine 10 and waste heat recovery system 86 of FIG. 2.

Figure 4:
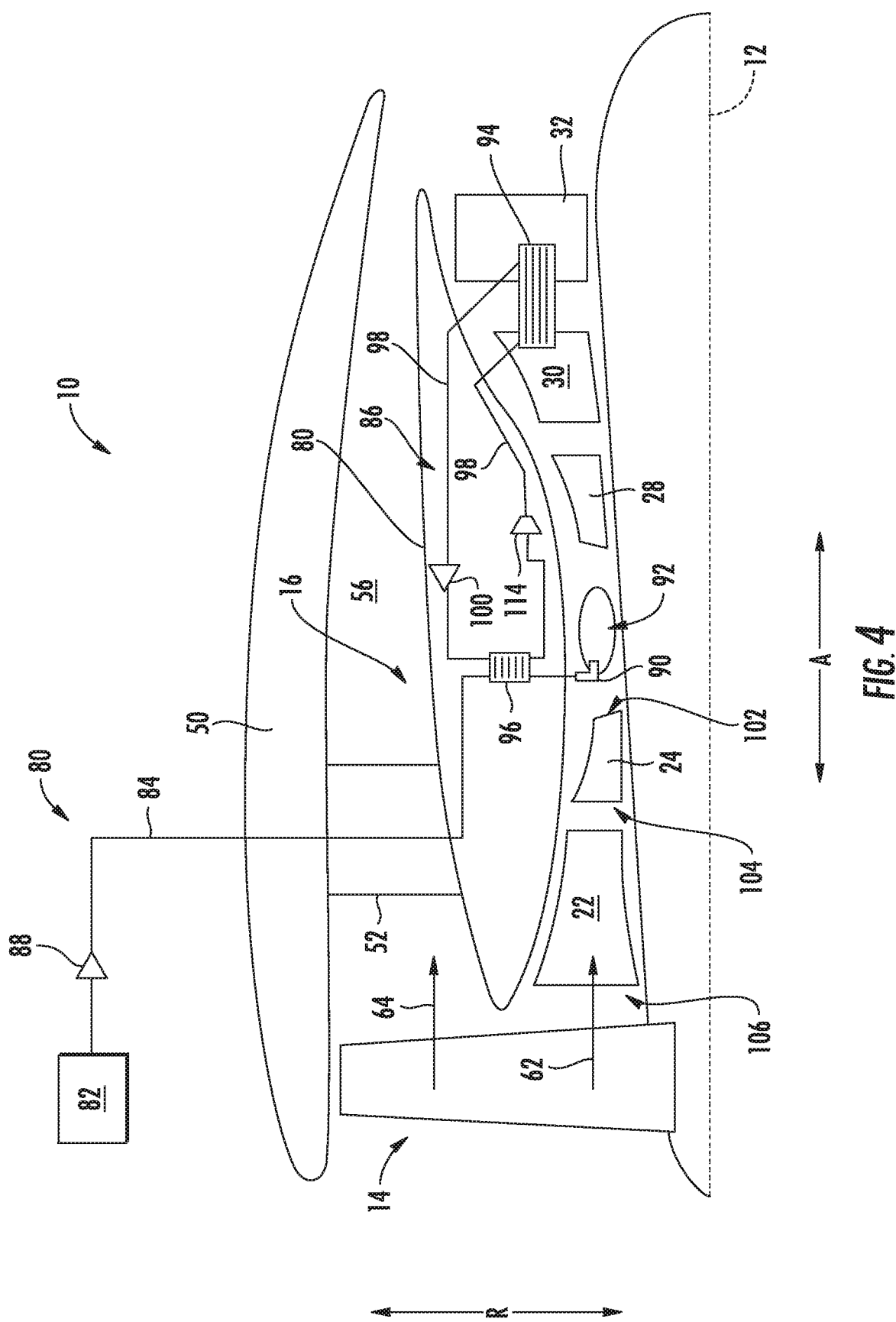
FIG. 4 is a simplified schematic view of a gas turbine engine and a waste heat recovery system in accordance with another exemplary embodiment of the present disclosure.

For example, the exemplary waste heat recovery system 86 of FIG. 4 generally includes a heat source exchanger 94, a heat sink exchanger 96, a thermal transfer bus 98 extending from the heat source exchanger 94 to the heat sink exchanger 96, and a pump 100 in fluid communication with the thermal transfer bus 98. However, for the exemplary embodiment of FIG. 4, the heat source exchanger 94 is in thermal communication with a turbine section and an exhaust section 32 of the gas turbine engine 10, and further, the heat sink exchanger 96 is in thermal communication with a fuel delivery system 80 of the gas turbine engine 10.

Notably, it will be appreciated that in certain exemplary embodiments, the fuel delivery system 80 may additionally be utilized as a heat sink for other systems of the gas turbine engine 10. As such, the fuel flow through the fuel delivery system 80 (or other component of the fuel delivery system 80 being utilized as the heat sink) may already be at a relatively high temperature prior to interacting with the heat sink exchanger 96 of the waste heat recovery system 86. In such a manner, it will be appreciated that, in at least certain exemplary aspects, the fuel delivery system 80 may define a reference point at which the heat sink exchanger 96 is thermally coupled to the fuel delivery system 80, and may further define a sink reference temperature at, or immediately upstream of, the reference point. The reference point may be within a fuel line 84 of the fuel delivery system 80, on a fuel nozzle 90 of the fuel delivery system 80, etc. Similarly, the turbine section may define a source reference temperature at a location at, or immediately upstream of where the heat source exchanger 94 is thermally coupled to the turbine section and exhaust section 32 (a location within the LP turbine 30 for the embodiment depicted). The relationship of the source reference temperature and sink reference temperature for the embodiment of FIG. 4 may be similar to the relationship between the source reference temperature 112 and sink reference temperature 110 for the embodiment described above with reference to FIGS. 2 and 3. Accordingly, for the embodiment shown the source reference temperature is less than the sink reference temperature (such as at least about 5% less, such as at least about 10% less). However, as with the embodiment described above, given the inclusion of the pump 100 in the thermal transfer bus 98, the waste heat recovery system 86 may still be capable of extracting heat from the turbine section and exhaust section 32 and transferring such heat to a higher temperature location where such heat may be utilized more efficiently.

It will further be appreciated that in still other exemplary embodiments, other suitable configurations may be provided. For example, in other embodiments, the heat source from which the heat source exchanger 94 extracts heat energy may be any other suitable heat source. For example, in other exemplary embodiments the heat source may be any other suitable engine system generating waste heat. For example, in other embodiments, the heat source may be an oil system of the gas turbine engine, such as a lubrication or gear oil system of the engine. With such a configuration, the waste heat recovery system 86 may extract heat from such oil system at a relatively low temperature to a thermal transfer fluid, and increase a temperature and pressure of such thermal transfer fluid using a pump to enable the provision of such heat to a heat sink at a relatively high temperature.

Figure 5:
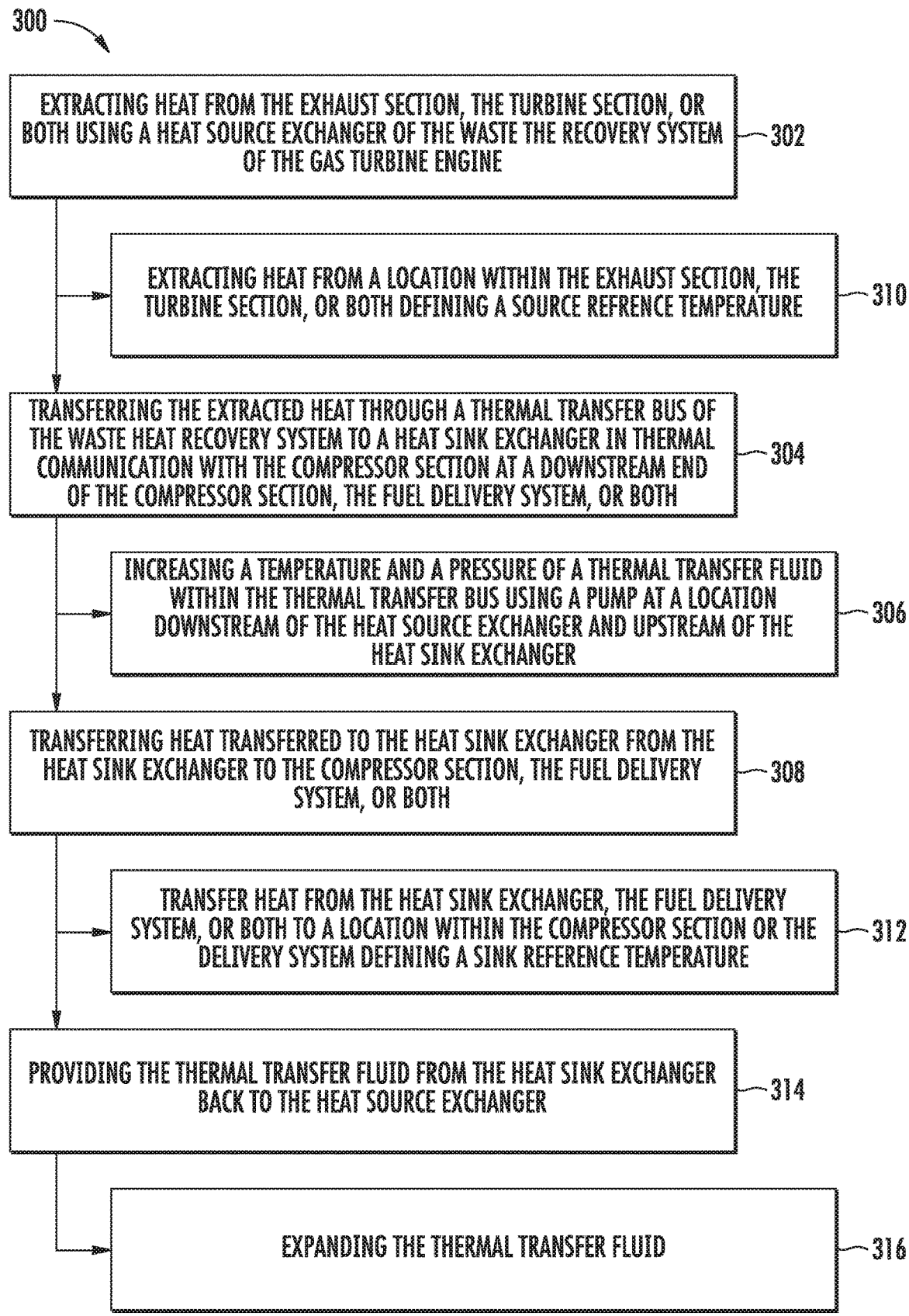
FIG. 5 is a flow diagram of a method for operating a gas turbine engine including a waste heat recovery system in accordance with the present disclosure.

Referring now to FIG. 5, a method 300 for operating a gas turbine engine including a waste heat recovery system in accordance with an exemplary aspect of the present disclosure is provided. In certain exemplary aspects, the method 300 may be utilized with one or more of the exemplary gas turbine engines described above. In such a manner, it will be appreciated that the exemplary gas turbine engine may generally include a fuel delivery system, as well as a compressor section, a combustion section, a turbine section, and an exhaust section in serial flow order.

The method 300 includes at (302) extracting heat from the exhaust section, the turbine section, or both using a heat source exchanger of the waste the recovery system of the gas turbine engine.

The method 300 further includes at (304) transferring the extracted heat through a thermal transfer bus of the waste heat recovery system to a heat sink exchanger in thermal communication with the compressor section at a downstream end of the compressor section, the fuel delivery system, or both. For the aspect depicted, transferring the extracted heat through the thermal transfer bus at (304) includes at (306) increasing a temperature and a pressure of a thermal transfer fluid within the thermal transfer bus using a pump at a location downstream of the heat source exchanger and upstream of the heat sink exchanger.

Further, the method 300 includes at (308) transferring heat transferred to the heat sink exchanger at (304) from the heat sink exchanger to the compressor section, the fuel delivery system, or both.

Referring still to the exemplary method 300 depicted, extracting heat from the exhaust section, the turbine section, or both using the heat source exchanger at (302) includes at (310) extracting heat from a location within the exhaust section, the turbine section, or both defining a source reference temperature. Similarly, for the exemplary aspect depicted, transferring heat from the heat sink exchanger to the compressor section, the fuel delivery system, or both at (308) includes at (312) transferring heat from the heat sink exchanger, the fuel delivery system, or both to a location within the compressor section or the delivery system defining a sink reference temperature. For the exemplary aspect depicted, the source reference temperature is less than the sink reference temperature, such as at least about five percent less than the sink reference temperature, such as at least about ten percent less than sink reference temperature.

Further, still, the method 300 includes at (314) providing the thermal transfer fluid from the heat sink exchanger back to the heat source exchanger. More specifically, for the exemplary aspect depicted, providing thermal transfer fluid from the heat sink exchanger back to the heat source exchanger at (314) includes at (316) expanding the thermal transfer fluid.

Inclusion of a waste heat recovery system in accordance with one or more of these embodiments may generally allow for a more efficient gas turbine engine. More specifically, inclusion of a waste heat recovery system in accordance with one or more of these embodiments may generally allow for utilization of "waste heat" (i.e., heat that is not being utilized to provide work for the engine, or not efficiently being utilized to provide work for the engine) to increase an efficiency of the engine. For example, inclusion of a waste heat recovery system in accordance with one or more of these embodiments may allow for utilization of at least a portion of any heat remaining in, e.g., an exhaust of the engine to heat an airflow or fuel provided to the combustion chamber prior to such airflow or fuel being combusted. Such may generally result in a greater amount of energy generation through such combustion process, which may allow for the engine to extract an increased amount of work through the combustion process (resulting in a more efficient use of such extracted heat energy, and a more efficient gas turbine engine). For example, in certain exemplary embodiments, inclusion of a waste heat recovery system in accordance with one or more of these embodiments may result in a 2%-5% increase in efficiency (as measured by specific fuel consumption).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
   a compressor section, a combustion section, a turbine section, and an exhaust section in serial flow order and together defining a core air flowpath, the compressor section defining a downstream end;
   a fuel delivery system for providing a flow of fuel to the combustion section; and
   a waste heat recovery system comprising:
      a heat source exchanger disposed within the core air flowpath such that the heat source exchanger is in thermal communication with the turbine section within the core air flowpath, within the exhaust section such that the heat source exchanger is in thermal communication with the exhaust section, or both, to extract heat therefrom;
      a heat sink exchanger in thermal communication with the fuel delivery system, the core air flowpath upstream of the combustion section, or both;
      a thermal transfer bus comprising a thermal transfer fluid and extending from the heat source exchanger to the heat sink exchanger; and
      a pump in fluid communication with the thermal transfer bus downstream of the heat source exchanger and directly upstream of the heat sink exchanger for increasing a temperature and a pressure of the thermal transfer fluid in the thermal transfer bus received by the heat sink exchanger,
      wherein the pump is configured to increase the temperature of the thermal transfer fluid in the thermal transfer bus by at least 150 degrees Celsius.

2. The gas turbine engine of claim 1, wherein the thermal transfer bus is a closed-loop thermal transfer bus further extending from the heat sink exchanger back to the heat source exchanger.

3. The gas turbine engine of claim 2, wherein the waste heat recovery system further comprises an expansion device in fluid communication thermal transfer bus downstream of the heat sink exchanger and upstream of the heat source exchanger.

4. The gas turbine engine of claim 1, wherein the heat sink exchanger is in thermal communication with the compressor section at the downstream end of the compressor section.

5. The gas turbine engine of claim 4, wherein the heat sink exchanger is in thermal communication with the compressor section at an exit of an HP compressor of the compressor section.

6. The gas turbine engine of claim 1, wherein the heat source exchanger is in thermal communication with the exhaust section.

7. The gas turbine engine of claim 1,
   wherein the heat sink exchanger is in thermal communication with the compressor section at the downstream end,
   wherein the downstream end of the compressor section defines a sink reference temperature,
   wherein the heat source exchanger is in thermal communication with the exhaust section,
   wherein the exhaust section defines a source reference temperature, and
   wherein the source reference temperature is less than the sink reference temperature within at least one range of engine operating speeds.

8. The gas turbine engine of claim 7, wherein the source reference temperature is at least about five percent less than the sink reference temperature.

9. The gas turbine engine of claim 7, wherein the at least one range is between about seventy-five percent and about one hundred percent of a maximum rated speed of the engine.

10. The gas turbine engine of claim 7, wherein the heat sink exchanger is in thermal communication with the compressor section at an exit of an HP compressor of the compressor section.

11. A gas turbine engine comprising:
    a compressor section defining a downstream end and the downstream end defining a sink reference temperature;
    a combustion section;
    a turbine section;
    an exhaust section arranged in serial flow order with, and defining a core air flowpath with, the compressor section, the combustion section, and the turbine section, the exhaust section further defining a source reference temperature, the source reference temperature being less than the sink reference temperature within at least one range of engine operating speeds;
    a fuel delivery system for providing a flow of fuel to the combustion section; and
    a waste heat recovery system comprising
       a heat source exchanger in thermal communication with the exhaust section to extract heat therefrom;
       a heat sink exchanger in thermal communication with the core air flowpath upstream of the combustion section;
       a thermal transfer bus comprising a thermal transfer fluid and extending from the heat source exchanger to the heat sink exchanger; and
       a pump in fluid communication with the thermal transfer bus downstream of the heat source exchanger and upstream of the heat sink exchanger for increasing a temperature and a pressure of the thermal transfer fluid in the thermal transfer bus received by the heat sink exchanger,
       wherein the pump is configured to increase the temperature of the thermal transfer fluid in the thermal transfer bus by at least 150 degrees Celsius.

12. The gas turbine engine of claim 11, wherein the waste heat recovery system further includes a pump in fluid communication with the thermal transfer bus downstream of the heat source exchanger and upstream of the heat sink exchanger for increasing a temperature and a pressure of the thermal transfer fluid in the thermal transfer bus.

13. The gas turbine engine of claim 11, wherein the at least one range is between about seventy-five percent and about one hundred percent of a maximum rated speed of the engine.

14. The gas turbine engine of claim 11, wherein the at least one range is between a cruise engine operating speed and a takeoff engine operating speed.

15. A method for operating a gas turbine engine comprising a fuel delivery system and a compressor section, a combustion section, a turbine section, and an exhaust section in serial flow order, the method comprising:

extracting heat from the exhaust section using a heat source exchanger of a waste heat recovery system of the gas turbine engine disposed within the exhaust section, from the turbine section within a core air flowpath using the heat source exchanger disposed within the core flowpath, or both; and transferring the extracted heat through a thermal transfer bus of the waste heat recovery system to a heat sink exchanger in thermal communication with the compressor section proximate a downstream end of the compressor section, the fuel delivery system, or both, wherein transferring the extracted heat through the thermal transfer bus comprises increasing a temperature and a pressure of a thermal transfer fluid within the thermal transfer bus received by the heat sink exchanger using a pump at a location downstream of the heat source exchanger and directly upstream of the heat sink exchanger, and wherein the temperature of the thermal transfer fluid in the thermal transfer bus is increased by the pump by at least 150 degrees Celsius.

16. The method of claim 15, further comprising:
transferring heat from the heat sink exchanger to the compressor section proximate the downstream end.

17. The method of claim 16,
wherein extracting heat from the exhaust section using the heat source exchanger comprises extracting heat from a location within the exhaust section defining a source reference temperature, wherein transferring heat from the heat sink exchanger to the compressor section proximate the downstream end comprises transferring heat from the heat sink exchanger to a location defining a sink reference temperature, and wherein the source reference temperature is less than the sink reference temperature within at least one range of engine operating speeds.

18. The method of claim 17, wherein the source reference temperature is at least about five percent less than the sink reference temperature.

19. The method of claim 15, further comprising:
providing the thermal transfer fluid from the heat sink exchanger back to the heat source exchanger.

* * * * *